Patented June 3, 1941

2,244,183

UNITED STATES PATENT OFFICE 2,244,183

POLYMERIC MATERIALS

Paul R. Austin, Wilmington, Del., assignor to E. I. du Pont de Nemours & Company, Wilmington, Del., a corporation of Delaware No Drawing. Application August 26, 1938, Serial No. 226,989

9 Claims. (Cl. 260—33)

This invention relates to synthetic linear polyamides and more particularly to plasticized compositions containing the same.

A new class of fiber-forming material known as synthetic linear condensation polymers ("superpolymers") is described in United States Patents 2,071,250-2,071,253. A characteristic property of these polymers is that they can be formed into filaments which can be cold drawn into fibers showing molecular orientation along the fiber axis. Of these polymers, the polyamides are particularly useful for the preparation of fibers, bristles, ribbons, sheets, rods, tubes, and the like. The polyamides are of two types, those derived from polymerizable monoaminomonocarboxylic acids and their amide-forming derivatives, and those derived from the reaction of suitable diamines with suitable dicarboxylic acids or amide-forming derivatives of dibasic carboxylic acids. It will be noted that the polyamides are derived from bifunctional amide-forming derivatives and that the amide group forms an integral part of the main chain of atoms. On hydrolysis with strong mineral acids, the polyamides revert to the bifunctional reactants from which they are derived. For example, a polyamide derived from a diamine and a dibasic acid yields on hydrolysis with hydrochloric acid, the dibasic acid and the diamine hydrochloride.

Although the synthetic linear polyamides as a class are microcrystalline and have fairly high and sharp melting points, they can be formed into many useful objects without the use of solvents or plasticizers. This is accomplished by spinning, extruding, or otherwise forming the object from the molten polyamide. To improve the properties of the products thus formed, it is generally desirable to subject them to a process of cold drawing (application of tensile stress) or to a process of cold working, e. g. cold rolling (application of compressive stress) or by subjecting them to both cold drawing and cold working. The products thus formed are unusually strong, have high melting points, and for many purposes are sufficiently pliable. For certain uses, however, and particularly for use in the form of films, sheets, and the like, greater pliability is sometimes desired.

Because of the marked difference in structure and properties, e. g. solubility and compatibility characteristics, between the polymers with which the present invention is concerned and fiber-forming materials derived from cellulosic derivatives, the plasticizer requirements of these two classes of materials differ very markedly. For these reasons it is impossible to predict whether a given plasticizer for a cellulose derivative will function as a polyamide plasticizer. The fact that polyamides are insoluble in the solvents used for cellulosic materials and are in general soluble only in phenols and formic acid is also a limiting factor in the selection of a plasticizer to be incorporated by the customary solvent procedure. Another factor which must be taken into consideration is that polyamides, unlike cellulosic derivatives, are susceptible to cold drawing and that polyamide filaments, ribbons, and the like are normally cold drawn before they are used. For the preparation of such products the plasticizer must be one which does not interfere with cold drawing.

This invention has as an object the preparation of new compositions useful in making filaments, bristles, ribbons, films, sheets, rods, tubes, etc. A further object is to improve the properties, particularly the pliability, of synthetic linear polyamides and of articles derived therefrom.

These and other objects which will become apparent from the following description are accomplished by incorporating in the polyamide a sulfonamide-formaldehyde reaction product.

It has now been found that products of greater pliability can be obtained from the polyamides by incorporating therein a sulfonamide-formaldehyde reaction product, such as toluene sulfonamide-formaldehyde resins sold commercially as the "Santolites," or cyclohexane sulfonamide-formaldehyde resins. Although the polyamides in general have a very low order of solubility in or compatibility with other organic compounds, in most cases the sulfonamide-formaldehyde resins are compatible with polyamides in all proportions. For most purposes quantities of the sulfonamide-formaldehyde resins ranging from 1 to 75 per cent by weight of the polyamide are used to greatest advantage, the amount used depending on the nature of the sulfonamide-formaldehyde resin and the properties desired in the final product. The addition of the sulfonamide-formaldehyde resin greatly improves the clarity, apparently functioning by retarding crystallization. The addition of the sulfonamide-formaldehyde resin usually causes a lowering of the softening point, but does not materially lower the strength of the product. In fact, surprisingly large amounts of these resins may be used in conjunction with certain polyamides, and tough and unusually elastic products are obtained. Moreover, the products which contain a sulfonamide-formaldehyde resin retain their strength better on exposure to sunlight than do the pure polyamides. Unless used in large amounts, the sulfonamide-formaldehyde resins do not interfere with the orientation of the polymer molecules by the process of cold drawing or cold rolling; it actually improves the cold working properties of the product.

A convenient method for incorporating the sulfonamide-formaldehyde resin in the preformed polyamide articles, e. g. sheets, consists in immersing the polyamide in a solution of the sulfonamide-formaldehyde resin in a non-solvent for the polyamide. Solutions of the sulfonamide-formaldehyde resin in alcohols are especially useful. In many instances selective absorption occurs, as evidenced by the fact that the concentration of the sulfonamide-formaldehyde resin within the polyamide can be made to exceed that in the solution. After the desired amount of sulfonamide-formaldehyde resin has been absorbed by the polyamide, the polyamide is removed and dried. The plasticizing effect of the sulfonamide-formaldehyde resin is enhanced by the presence of small quantities of water or other hydroxylated solvents. The amount of water which the polyamide absorbs from the air under ordinary conditions of humidity, although only a few per cent, is usually sufficient for this purpose.

Other methods of incorporating the sulfonamide-formaldehyde resin can also be used. For example, the polyamide and the sulfonamide-formaldehyde resin can be dissolved in a mutual solvent and filaments or films cast from the solution. The lower fatty acids, e. g. formic acid, can be used as solvents for this purpose. In certain instances, e. g. in the case of many interpolymers, alcohols and mixtures of alcohols with halogenated hydrocarbons can be used as solvents.

The following examples are illustrative of methods for practicing my invention.

Example I

Four (4) parts of a copolyamide or interpolyamide (prepared from equimolecular parts of hexamethylene diammonium adipate and decamethylene diammonium sebacate) were dissolved with 2 parts of a toluene sulfonamide-formaldehyde condensation product, commercially known as Santolite MS, in 24 parts of n-butyl alcohol by heating the mixture under reflux for four hours at 140° C. A portion of this solution was poured, while still hot, onto a glass plate at about 70° C. and an even film poduced by means of a doctor knife. After baking for one hour at 100° C., the film was removed from the glass plate by immersion in water. The resulting film (0.007 inch thick) was transparent, pliable, and strong. It softened at 127° C. when tested on a copper block in the open air. The pliability of these films is enhanced by the presence of one or two per cent moisture.

Example II

Fifteen (15) parts of a copolyamide (prepared from equimolecular parts of hexamethylene diammonium adipate and decamethylene diammonium sebacate), 12.5 parts of a toluene sulfonamide-formaldehyde resin, 12.5 parts of dimethyl phthalate, and 10 parts of p-tertiary amylphenol were dissolved in 48 parts of a solvent consisting of 20 parts of chloroform, 20 parts of methanol, and 8 parts of n-butyl alcohol, by heating the mixture under reflux for two hours at 120° C. A portion of this solution was poured while still hot onto a glass plate at 40° C. and an even film produced by means of a doctor knife. After baking for one hour at 100° C., the film was removed from the glass plate by immersion in water. The resulting film was extremely pliable, somewhat elastic, and quite strong. The tensile strength was 2000 pounds per sq. in. based on original dimensions. It softened at 95°–100° C. when tested on a copper block in the open air.

Example III

A ribbon of polyhexamethylene adipamide, a synthetic linear polymer derived from hexamethylenediamine and adipic acid, was prepared by extruding the molten polymer between rollers immersed in cold water. A sample of this ribbon, about 0.030 inch thick, was immersed in a 20 per cent solution of a toluene sulfonamide-formaldehyde resin in 75 per cent alcohol maintained at 70°–80° C. After two hours the ribbon was removed, rinsed twice with 50 per cent aqueous alcohol and dried to constant weight over calcium chloride. The ribbon, which showed an increase in weight of 9.5 per cent, was more pliable than the original ribbon. When allowed to remain for several hours in air under normal conditions of temperature and humidity, it absorbed about 2 per cent of its weight of moisture. The ribbon containing both the toluene sulfonamide-formaldehyde resin and the moisture was much more pliable than either the unplasticized ribbon or the ribbon containing only the toluene sulfonamide-formaldehyde resin.

Example IV (1) Fifteen (15) parts of an interpolyamide (prepared from equimolecular parts of hexamethylene diammonium adipate and decamethylene diammonium sebacate), 10 parts of diphenylolpropane, and 5 parts of toluene sulfonamide-formaldehyde resin were dissolved in 30 parts of n-butyl alcohol by heating the mixture under reflux for four hours at 140° C.

(2) Fifteen (15) parts of the above-mentioned interpolyamide, 10 parts of diphenylolpropane, 5 parts of a toluene sulfonamide-formaldehyde resin, and 7 parts of blue pigment were compounded with 38 parts of n-butyl alcohol. A portion of solution (1) was poured onto a piece of cotton sateen and an even coat produced by means of a doctor knife. This coated fabric was then baked at 50° C. for three hours. A second coat, identical with that just described, was then applied and the solvent again removed by baking at 50° C. for three hours. A portion of solution (2) was then applied and an even coat produced by means of a doctor knife and the fabric baked at 50° C. for three hours. The coated fabric was pressed under 500 pounds per sq. in. at 28° C. to produce a smooth, uniform surface. This sample showed very good resistance to abrasion in comparison with other standard coated fabrics. The coated fabric was strong, pliable, and had good draping properties.

Example V

Eight (8) parts of an interpolyamide (prepared from equimolecular parts of hexamethylene diammonium adipate and decamethylene diammonium sebacate), and 8 parts of a cyclohexane sulfonamide-formaldehyde resin were dissolved in 16 parts of n-butyl alcohol, by heating the mixture under reflux for 3 hours. A portion of this solution was poured while still hot onto a glass plate at 90° C. and an even film produced by means of a doctor knife. After baking for one hour at 90° C., the film was removed from the glass plate by immersion in water. The resulting film was clear, pliable, and quite strong.

It is to be understood that the aforementioned examples are merely illustrative of the compositions of this invention and their manner of preparation. As examples of additional synthetic linear polyamides which can be plasticized by the addition of sulfonamide-formaldehyde resins may be mentioned polytetramethylene adipamide, polytetramethylene sebacamide, polypentamethylene adipamide, polypentamethylene sebacamide, polyhexamethylene glutaramide, polyhexamethylene sebacamide, polyoctamethylene adipamide, polydecamethylene carbamide, poly-p-xylylene sebacamide, polyphenylene diacetamide, and the polyamide derived from 3,3'-diaminodipropyl ether and adipic acid. Polymerized 6-aminocaproic acid, polymerized 9-aminononanoic acid, and polymerized 11-aminoundecanoic acid are examples of linear polymers derived from amino acids which may also be used. As illustrated in Example I, copolyamides or interpolyamides can likewise be plasticized by sulfonamide-formaldehyde resins. Obviously, the invention is applicable to mixtures of polyamides. In general, the synthetic linear polyamides do not exhibit fiber-forming properties unless they have an intrinsic viscosity above 0.4. Likewise, to be useful in making films, ribbons, rods, etc., the polyamides should have an intrinsic viscosity above 0.4, and preferably above 0.6. The expression, intrinsic viscosity, is to be understood in accordance with the definition thereof contained in Carothers U. S. Patent 2,130,948. This invention is concerned primarily with plasticizing polyamides which exhibit fiber-forming properties.

Instead of the polyamides mentioned above which are obtainable from bifunctional polyamide-forming reactants as essentially sole reactants, I may use the linear polyamides obtained by including with the polyamide-forming reactants used to prepare the polyamide other bifunctional reactants, such as glycols and hydroxy acids. As examples of such modified polyamides may be mentioned those derived from diamines, dibasic acids, and glycols; those derived from diamines, dibasic acids, and hydroxy acids; those derived from amino acids, dibasic acids, and glycols; and those derived from amino acids and hydroxy acids. Although these products contain ester linkages they can still be referred to as polyamides since they contain a plurality of amide linkages and retain many of the desirable properties of the straight polyamides. Like the polyamides derived solely from polyamide-forming reactants, these modified polyamides do not exhibit fiber-forming properties until their intrinsic viscosity is at least 0.4.

As additional examples of sulfonamide-formaldehyde resins which may be used in making the compositions of this invention may be mentioned condensation products of formaldehyde with aromatic sulfonamides, such as toluene sulfonamides, N-ethyl toluene sulfonamides, diphenyl sulfonamides, naphthalene sulfonamides, anthracene sulfonamides, and in general polynuclear sulfonamides. Other useful resins are those obtained by the condensation of formaldehyde with cyclopentane sulfonamides, heptane sulfonamides, cetane sulfonamides, and in general sulfonamides derived from the product formed by the treatment of the appropriate hydrocarbon with chlorine and sulfur dioxide.

This invention is not limited to compositions consisting of polyamide and sulfonamide-formaldehyde resin alone. As already indicated, the plasticizing effect of the sulfonamide-formaldehyde resin is increased by the presence of a small amount of water. Other hydroxylated non-solvents, particularly alcohols such as methanol, propanol, isobutanol, benzyl alcohol, cyclohexanol, hexamethylene glycol, and glycerol have a similar effect. Moreover, there may be associated with the polyamide-sulfonamide-formaldehyde resin compositions other types of plasticizer, e. g. dibutyl phthalate, tricresyl phosphate, carboxylic acids, e. g. lactic acid and mandelic acid; amides, particularly N-alkyl sulfonamides; and phenols, e. g. diamylphenol. Particularly valuable products are obtained by using the plasticizers of this invention in conjunction with phenols, especially alkyl phenols. Such a composition is illustrated in Example II. The compositions of this invention may also contain other types of modifying agents, e. g. luster modifying materials, pigments, dyes, antioxidants, oils, antiseptics, cellulosic derivatives, etc.

The compositions containing polyamide and sulfonamide-formaldehyde resins are useful in many forms and for many purposes. Typical applications are yarns, fabrics, bristles, surgical sutures, fishing leaders, fishline, dental floss, rods, tubes, films, ribbons, sheets, safety glass interlayers, molded articles, turnery compositions, adhesives, electrical insulation (e. g., for wires), impregnating agents, and coating compositions. An advantage which these compositions have over unmodified polyamides is that they are more pliable. This fact is most important in connection with the use of the product in the sheet form. It is also important in molding, particularly injection molding. A further advantage of these compositions over unmodified polyamides is that they are more readily cold rolled. Another advantage of the present composition is that they exhibit superior durability on outdoor exposure. Viewed from the standpoint of the sulfonamide-formaldehyde condensation products, the addition of polyamide brings about an increase in toughness. Thus, whereas the sulfonamide-formaldehyde resins alone cannot be used in making unsupported films because of their brittleness and lack of strength, the addition of 25% of polyamide to these resins makes them useful in making unsupported films. The resulting films are clear, pliable, and tough.

As many apparently widely different embodiments of this invention may be made without departing from the spirit and scope thereof, it is to be understood that I do not limit myself to the specific embodiment thereof except as defined in the appended claims.

I claim:

1. A synthetic linear polyamide plasticized with a sulfonamide-formaldehyde reaction product, the said polyamide being the reaction product of a polymer-forming composition comprising reacting materials selected from the class consisting of (a) polymerizable monoaminomonocarboxylic acids, and (b) mixtures of diamine and dibasic carboxylic acid; the said polyamide having an intrinsic viscosity of at least 0.4.

2. A synthetic linear polyamide plasticized with a sulfonamide-formaldehyde reaction product, the said polyamide being the reaction product of a polymer-forming composition comprising reacting materials selected from the class consisting of (a) polymerizable monoaminomonocarboxylic acids, and (b) mixtures of diamine and dibasic carboxylic acid; the said polyamide being one which can be formed into fibers showing by characteristic X-ray patterns orientation along the fiber axis.

3. A synthetic linear polyamide plasticized with a sulfonamide-formaldehyde reaction product, the said polyamide being the reaction product of a polymer-forming composition comprising a polymerizable monoaminomonocarboxylic acid, and having an intrinsic viscosity of at least 0.4.

4. A synthetic linear polyamide plasticized with a sulfonamide-formaldehyde reaction product, the said polyamide being the reaction product of a polymer-forming composition comprising a mixture of diamine and dibasic carboxylic acid, and having an intrinsic viscosity of at least 0.4.

5. The plasticized synthetic linear polyamide set forth in claim 1 wherein the said sulfonamide-formaldehyde reaction product is an aromatic sulfonamide-formaldehyde reaction product.

6. A synthetic linear polyamide plasticized with a mixture comprising a sulfonamide-formaldehyde reaction product and a hydroxylated non-solvent for the polyamide, the said polyamide being the reaction product of a polymer-forming composition comprising reacting materials selected from the class consisting of (a) polymerizable monoaminomonocarboxylic acids, and (b) mixtures of diamine and dibasic carboxylic acid; the said polyamide having an intrinsic viscosity of at least 0.4.

7. The plasticized synthetic linear polyamide set forth in claim 6 wherein the said hydroxylated non-solvent is water.

8. The plasticized synthetic linear polyamide set forth in claim 1 wherein the said sulfonamide-formaldehyde reaction product is toluene sulfonamide-formaldehyde resin.

9. The plasticized synthetic linear polyamide set forth in claim 1 wherein the said sulfonamide-formaldehyde reaction product is cyclohexane sulfonamide-formaldehyde resin.

PAUL R. AUSTIN.